United States Patent [19]

Hegler

[11] Patent Number: 4,470,765
[45] Date of Patent: Sep. 11, 1984

[54] DEMAND RESPONSIVE HYDRAULIC PUMP

[75] Inventor: Gary G. Hegler, Chesaning, Mich.
[73] Assignee: General Motors Corporation, Detroit, Mich.
[21] Appl. No.: 473,663
[22] Filed: Mar. 9, 1983
[51] Int. Cl.³ .................. F04B 49/02; F04B 49/08
[52] U.S. Cl. ................................ 417/299; 417/310
[58] Field of Search ............... 417/283, 284, 299, 310

[56] References Cited

U.S. PATENT DOCUMENTS 2,193,244 3/1940 Wolcott ............................ 417/299
2,362,724 11/1944 Shea .............................. 417/299 X Primary Examiner—Richard E. Gluck
Attorney, Agent, or Firm—Donald F. Scherer

[57] ABSTRACT

A hydraulic power steering system has a vane type pump which is operable to supply fluid to a steering gear at a volumetric rate determined in part by the system pressure or the system demand. The vane pump flow is partially bypassed through a valve member disposed in the end cover and thrust plate of the pump. The valve is rotatably disposed in the end cover and spring loaded therein to a position which permits direct fluid communication between the pumping chambers and the pump inlet. The valve member has a portion thereof operated on by system pressure which is operable to close the bypass passages with increasing system pressure such that pump discharge flow to the power steering system will increase. The valve member can be moved sufficiently in response to system pressure to reopen the bypass passages thereby providing a limiting value for maximum system pressure.

2 Claims, 4 Drawing Figures

DEMAND RESPONSIVE HYDRAULIC PUMP

This invention relates to vane type power steering pumps and more particularly to such pumps having incorporated therein a demand responsive valve mechanism.

When a vehicle is equipped with a power steering system, the hydraulic pump is a parasitic loss within the system whenever a turning maneuver is not occurring. Many efforts have been made to reduce these loses. These efforts have generally resulted in the use of flow controlled type pumps which limit the fluid volume delivered to the steering gear thereby limiting the back pressure within the system.

The present invention seeks to reduce the losses by reducing the flow to the steering gear whenever a steering demand is not present. When a steering demand becomes present, the system will discharge the fluid required to satisfy the demand with the remaining fluid being bypassed. This differs from a flow controlled system in that the flow to the steering gear is continually limited regardless of the demand.

It is an object of this invention to provide an improved vane type power steering pump wherein the demand responsive valve mechanism is disposed in the end cover and is rotatably positionable therein to control the bypassing of fluid from the pumping chambers to the pump inlet and the valve mechanism is responsive to system pressure to reduce the bypass flow upon increase of system pressure.

This and other objects and advantages of the present invention will be more apparent from the following description and drawings in which.

Figure 1:
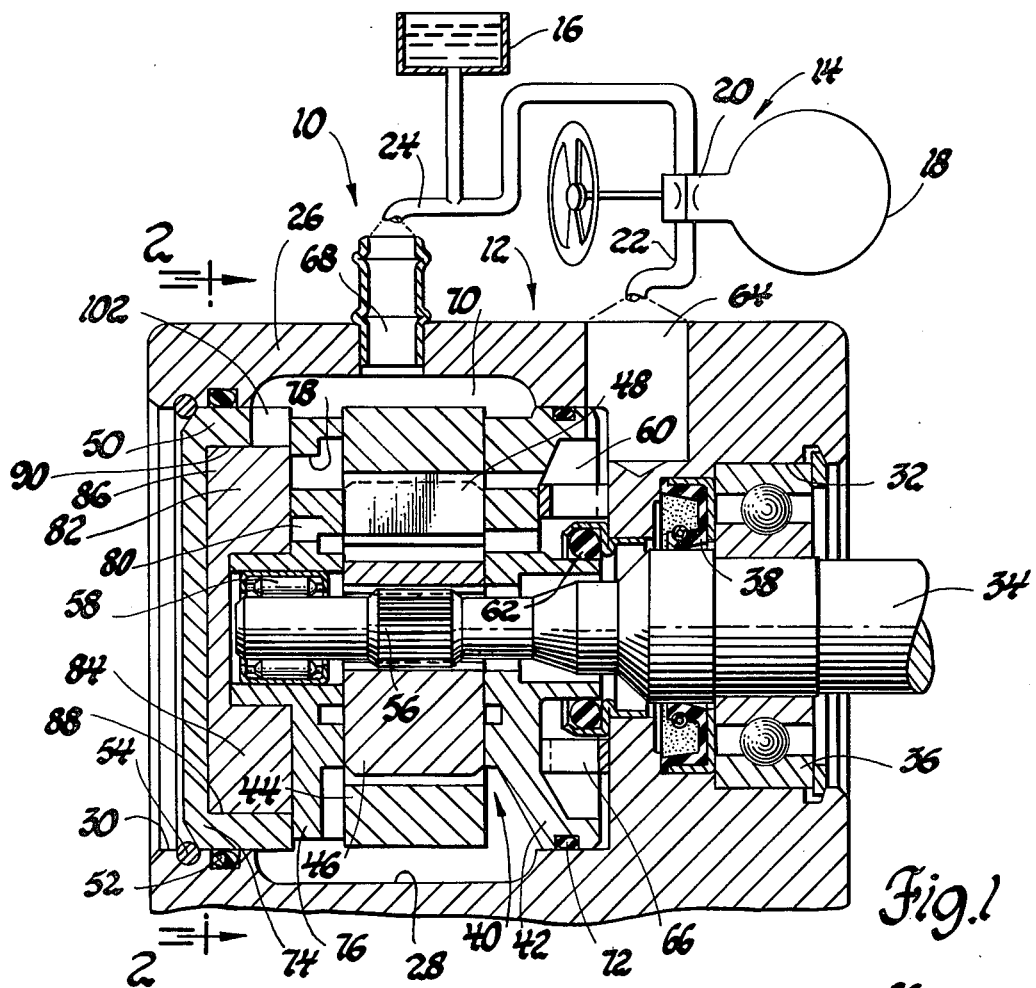
FIG. 1 is a cross-sectional elevational view of a vane type pump disposed in a power steering system shown in diagrammatic representation.

Referring to the drawings, wherein like characters represent the same or corresponding parts throughout the several views, there is seen a power steering system 10 which includes a vane type hydraulic pump, generally designated 12, a steering gear assembly, generally designated 14, and a fluid reservoir 16. The steering gear assembly 14 includes a power-assisted steering gear 18 and a steering valve 20. The steering gear assembly 14 may be constructed in accordance with the steering gear assembly shown in U.S. Pat. No. 3,022,772 issued Feb. 27, 1962, to Zeigler, and assigned to the assignee of this application.

The vane type pump 12 is connected through a pump discharge passage 22 to the steering valve 20 such that pressurized fluid from the pump 12 is delivered to the steering gear assembly 14. The steering valve 20 and reservoir 16 are both connected to the pump 12 through a pump return or inlet passage 24.

The vane type pump 12 includes a pump housing 26 having an internal housing cavity 28 with a large opening 30 at one end thereof and a smaller opening 32 at the other end thereof. A drive shaft 34 extends through the smaller opening 32 and is rotatably supported in a shaft bearing 36 which is secured in the opening 32 and is contacted by a shaft seal 38 also secured in the opening 32. The shaft seal 38 functions to prevent atmospheric air from entering the pump and low pressure fluid leakage from the pump.

The housing cavity 28 is substantially filled with a vane pump assembly, generally designated 40, and including a pressure plate 42, a cam ring 44, a rotor 46, a plurality of vanes 48 and an end cover and thrust plate 50. The end cover and thrust plate 50 cooperates with an annular seal ring 52 and a locking ring 54 to close the large opening 30.

The rotor 46 includes a plurality of slots in which the vanes 48 are slidably disposed in a well-known manner. The vanes 48 contact the inner surface of cam ring 44 so as to provide a plurality of peripheral pumping chambers which expand and contract upon the rotation of rotor 46 when it is driven through a spline connection 56 by the drive shaft 34.

The end cover and thrust plate 50 and pressure plate 42 establish the axial limits of the peripheral pump chambers and also includes pump inlet and discharge porting arrangements disposed in a well-known manner. The end cover and thrust plate 50 supports a shaft bearing 58 in which is rotatably supported the left end of drive shaft 34.

The discharge from the pumping chambers of the vane pump assembly 40 passes through pressure plate 42 to a discharge space 60 formed between the right end of cavity 28 and the left end surface of pressure plate 42. Leakage to the drive shaft 34 from the discharge space 60 is prevented by an annular seal ring 62. The discharge space 60 is in fluid communication with a pump discharge port 64 which in turn is in fluid communication with the pump discharge passage 22.

To ensure that the vane pump assembly 40 is urged into abutment with the locking ring 54, an assist spring 66 disposed in the discharge space 60 is provided. Thus, even at atmospheric pressure within the discharge space 60 there is a leftward force provided which continually urges the pump vane assembly toward the locking ring 54.

The pump inlet passage 24 is connected with a pump inlet port 68 which in turn communicates with an inlet space 70 which surrounds the cam ring 44 in the housing cavity 28. The inlet space 70 communicates fluid from the return passage 24 to the inlet porting of the vane pump assembly 40. The inlet space 70 is sealed from direct communication with the discharge space 60 by an annular seal ring 72 disposed in the pressure plate 42.

The end cover and thrust plate 50 includes an end cover 74 and a thrust plate 76. The thrust plate 76 is operable to close the pumping chambers formed by the vanes 48 and has formed therein a pair of pressure ports 78. The thrust plate 76 also has formed therein a pair of undervane pressure ports 80.

The end cover 74 has rotatably disposed therein a bypass valve 82. The bypass valve 82 has a pair of radially extending arms 84 and 86 which extend into openings 88 and 90, respectively, which are formed in the end cover 74. The arm 84 divides opening 88 into a bypass chamber 92 and a pressure demand chamber 94 while the arm 86 divides opening 90 into a bypass chamber 96 and a pressure demand chamber 98. The bypass chambers 92 and 96 are in communication with respective bypass passages 100 and 102 formed in the end cover 74. The pressure demand chambers 94 and 98 are in fluid communication with the undervane pressure ports 80.

As is well-known, the undervane pressure ports 80 are maintained at a pressure level substantially equal to the pressure level in the pump discharge space 60. Therefore, the pressure demand chambers 94 and 98 are essentially maintained at a pressure equal to the pump discharge pressure.

Figure 2:
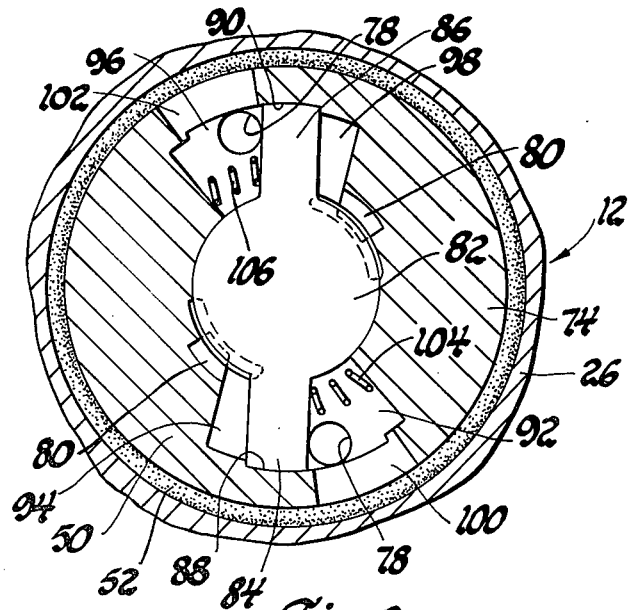
FIG. 2 is a view taken along line 2—2 of FIG. 1.

The valve 82 is urged to the position shown in FIG. 2 by a pair of valve springs 104 and 106. In this position, the ports 78 and 80 are in fluid communication through bypass chambers 92 and 96 with the bypass passages 100 and 102. Therefore, in this position, a portion of the discharge of the pump chambers is bypassed directly to the inlet space 70 and the remainder is delivered to pump discharge passage 22. The valve 82 will maintain this position until an increase in system pressure demand occurs. Upon an increase in system pressure demand, the pressure in chambers 94 and 98 will increase. This creates a differential pressure on the arms 84 and 86 which urges the counterclockwise rotation of valve 82 as seen in FIG. 2 toward the position shown in FIG. 3.

Figure 3:
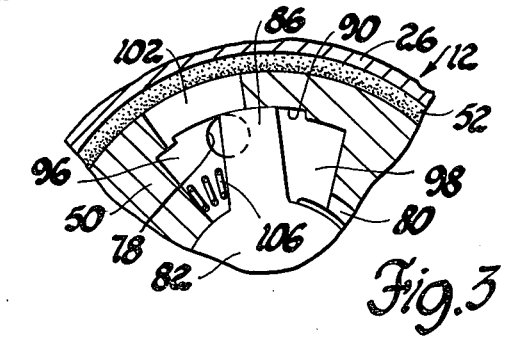
FIG. 3 is a partial sectional view showing an operational mode of the valve mechanism.
Figure 4:
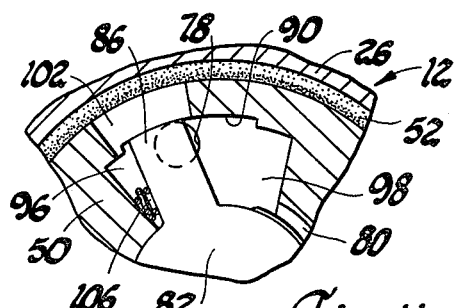
FIG. 4 is a partial sectional view showing another operational mode of the valve mechanism.

As seen in FIG. 3, the port 78 is partially closed resulting in a reduction in the amount of bypass flow and correspondingly an increase in the amount of discharge flow. As the pressure in chambers 94 and 98 increases further, the port 78 will be completely closed. A further increase in the pressure in chambers 94 and 98 will result in the valve 82 assuming the position shown in FIG. 4, where the port 78 is partially open to the pressure demand chamber 98.

It is also seen in FIG. 3 that the pressure demand chamber 98 is open to the bypass passage 102 such that high pressure fluid at port 78 can pass through the bypass passage 102 to the inlet space 70. This will limit the maximum system pressure which can occur since further increases in system pressure would simply result in further fluid flow through the pressure demand chamber 98 to the pump inlet space 70.

The embodiments of the invention in which an exclusive property or privilege is claimed are defined as follows:

1. A demand responsive hydraulic fluid pump for a power steering system comprising; pump outlet port means for delivering fluid from the pump; pump inlet port means for accepting fluid from the power steering system; vane pump means including a rotor, a cam and a plurality of vanes cooperating to form a plurality of expansible pump chambers for transferring fluid from said inlet port means to said outlet port means; a pair of end plates for closing the axial ends of said pump chambers, one of said end plates having passage means communicating with said pump chambers when said pump chambers are transferring fluid to said outlet port means; and end cover and valve assembly means including an end cover, spring means and a differential pressure responsive rotary valve member disposed in said end cover operable to connect said passage means to said inlet port means when no system demand is present, and demand chamber means formed by said end cover and said rotary valve means and having a fluid connection to the pressure of said outlet port means to cause rotation of said rotary valve member as system demand increases thereby closing said passage means and said valve member being rotatable to a position communicating both said passage means and said demand chamber means with said inlet port means when the maximum system demand pressure is achieved.

2. A demand responsive hydraulic fluid pump for a power steering system comprising; pump outlet port means for delivering fluid from the pump; pump inlet port means for accepting fluid from the power steering system; vane pump means including a rotor, a cam and a plurality of vanes cooperating to form a plurality of expansible pump chambers for transferring fluid from said inlet port means to said outlet port means; a pair of end plates for closing the axial ends of said pump chambers, one of said end plates including a thrust plate having passage means therethrough communicating with said pump chambers when said pump chambers are transferring fluid to said outlet port means, and an end cover and valve assembly means including an end cover, spring means and a differential pressure responsive rotary valve member disposed in said end cover operable to connect said passage means through said thrust plate to said inlet port means when no system demand is present, and demand chamber means formed by said end cover and said rotary valve means and having a fluid connection to the pressure of said outlet port means to cause rotation of said rotary valve member as system demand increases thereby closing said passage means and said valve member being rotatable to a position communicating both said passage means and said demand chamber means with said inlet port means when the maximum system demand pressure is achieved.

* * * * *